Oct. 3, 1961     J. A. BRIED     3,002,219
METHOD OF AND APPARATUS FOR PICKING FOWL
Filed Jan. 10, 1957
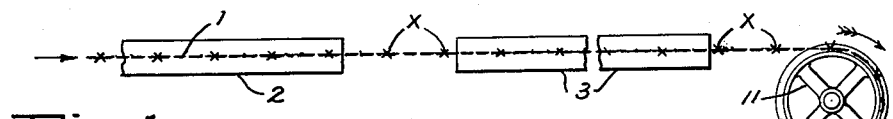
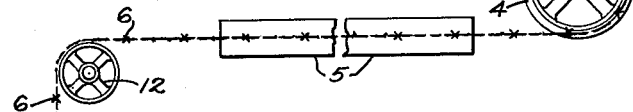
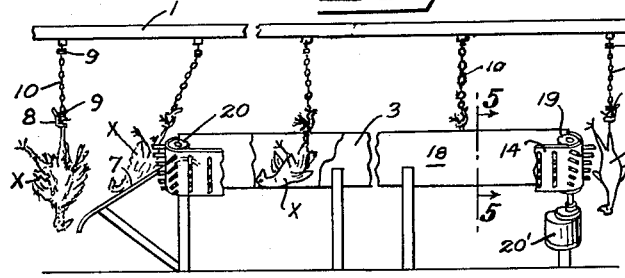
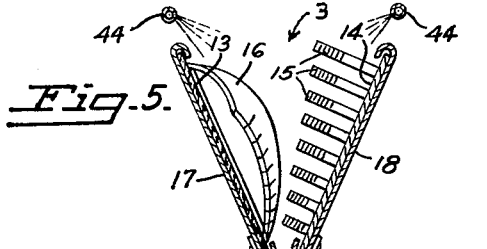
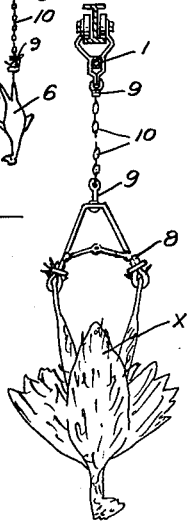
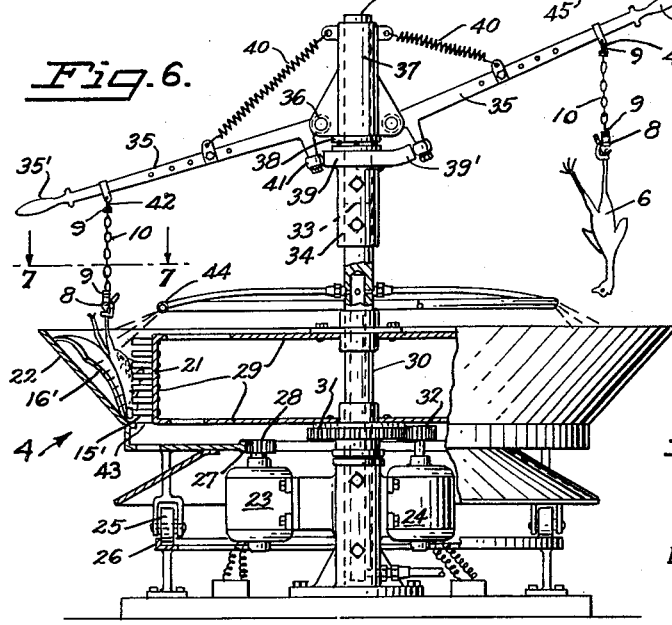
INVENTOR.
BY Julien A. Bried
Watson, Cole, Grindle & Watson
ATTORNEYS

United States Patent Office 3,002,219
Patented Oct. 3, 1961

3,002,219
METHOD OF AND APPARATUS FOR
PICKING FOWL
Julien A. Bried, Berkeley, Calif., assignor to Honolulu Oil
Corporation, a corporation of Delaware
Filed Jan. 10, 1957, Ser. No. 633,437
25 Claims. (Cl. 17—11.1)

This invention relates to the mechanical defeathering of fowl and has for its object an improvement in the new method now coming into general use wherein loose fowl are tumbled about in every direction while being struck all over by fast moving frictional defeathering beaters or "fingers" and which method requires that the fowl after killing and scalding be taken off of the overhead traveling conveyor line and fed loose into the revolving loose fowl picking machines, and after picking the fowls are generally re-hung on the overhead conveyor line and travel past the eviscerating crew who remove the entrails of the fowl by hand tools.

The present improvement overcomes the necessity of removing the fowl from the overhead traveling conveyor or carrier and yet secures the known advantages of tumbling loose picking but operates without removal from the existing overhead traveling conveyor. The improvement is the result of a surprising discovery by the undersigned that it was possible to tumble a fowl about in substantially every direction even though it was suspended from an overhead carrier or traveling conveyor, and completely defeather the tumbling fowl as it moved along, if the body of the fowl were supported from below to take the weight from the suspension so that the body was free to be tumbled about. A variation of the present invention is to provide a carrousel type of picking machine fitted with revolving suspending carrier means which automatically lift the finished suspended fowl out after they are picked, and part of which may be used at the return bends of the conveyor.

The details of the improved method and apparatus involved will follow a brief description of the accompanying drawings.

In the drawings,

FIG. 1 is a diagrammatical plan view of a fowl processing plant fowl picking line showing the position of my apparatus in relation to the overhead conveyor.

FIG. 2 is an enlarged side elevation showing a horizontal traveling conveyor with spaced shackles depending from it each with a fowl hanging from it, and under it in line with the conveyor is my improved trough-like channel shaped picking apparatus provided with a slanted guide to receive and guide the oncoming fowl X up into the trough to be "tumble picked" and emerging completely picked at the other end of the machine.

FIG. 3 is an enlarged view of a fowl suspended from the conveyor by one foot from a swivel shackle.

FIG. 4 is a similar view to that of FIG. 3 but showing the fowl suspended from the conveyor by both feet from a swivel shackle.

FIG. 5 is an enlarged cross section of FIG. 2 taken along the line 5—5 thereof.

FIG. 6 is a sectional elevation of a fowl picking machine of the carrousel type mentioned and provided with carrousel-like arms around it from which the fowl are each suspended and automatically lifted out of the machine after a predetermined time. Two only of the fowl carrying arms are shown in FIG. 6 to preserve clarity.

FIG. 7 is a plan view of a portion of FIG. 6 as seen from the line 7—7 thereof.

Before describing the drawings in detail it should be noted that this invention is essentially an improved automatic mechanical tumbling method of processing or defeathering fowl since it is practiced with similar equipment as now coming in general use for the defeathering of loose fowl free for tumbling about, especially such as depicted in applicant's copending patent application No. 466,835, filed November 4, 1954 (now U.S. Patent No. 2,846,719 of August 12, 1958) plus changes in arrangement and relation of the apparatus to the fowls being scalded or defeathered so as to be applicable to handle fowl supported below for the tumbling about process yet moving along spacedly partially suspended from a traveling conveyor or carrier. This is thought new in the art.

It should also be noted that in the automatic mechanical defeathering of conveyor suspended fowl heretofore practiced, the suspended fowl generally pass along between one or more pairs of opposed revolving picking drums having projecting frictional picking fingers or beaters, or pass along between opposed groups of otherwise moving picking fingers, in close contact with opposite sides of the suspended fowl, or the fowl pass along against the fingers of a single revolving drum arranged to exert a pull on the fowl suspension. This practice prevents the fowl from tumbling about, notwithstanding that in many of the machines the fowls are raised and lowered and/or turned about an axis, which is not "tumbling about," and which latter movement of the fowl presents every part of the fowl to the beaters or picking fingers including under and over the wings and between the legs, and neck, to remove all of the feathers everywhere regardless of the size of the fowls, and this distinction must be kept in mind to clearly comprehend the present improvement which concerns the tumbling about of suspended fowl.

Heretofore in fowl processing plants the fowl were first killed by cutting the necks and hung head down from shackles on an overhead chain conveyor traveling back and forth about the killing room to drain the blood, then passed through hot agitated water in long tanks, then successively through various types of feather picking machines, some with their picking fingers striking the fowl downward, others striking upward while the necks were held down, others into which the wings were manually guided, special neck machines, and special leg machines, and finally past a row of standing hand pickers to remove the pin feathers and what the machines missed, then passed through a flame to burn off the hairs, whereas by the free tumbling process only one picking machine and no manual workers were required. In both methods water is generally sprayed on the fowl being picked.

In FIG. 1 is shown in diagrammatic plan, part of a fowl processing plant layout using one of the present improved possible arrangements applied to the fowl hanging from a conventional overhead traveling conveyor after the fowl have left the killing rooms. In this figure the heavy dotted line 1 denotes the run of the traveling conveyor of any type, X the fowl spacedly hanging from the conveyor, 2 the last hot water or scalding tank (or modified present machine), 3 one of the present straight trough-type tumble pickers, 4 a circular tumble picker positioned under the return curve of the run of the conveyor, 5 another straight-trough tumble picker and 6 the picked fowl going to the eviscerating room.

The channel or trough-type of tumble picker 3 of FIG. 2 is more fully described in the undersigned's Patent No. 2,846,719 previously mentioned and to which reference is made as the picking trough or channel may be any of the shapes shown therein, as the present application is more concerned with the novel way this is used in connection with a suspended fowl, the picking trough or channel being arranged above the lower end of the suspended fowls so that as they move along they strike an inclined apron 7 and are dragged up to pass into the trough (or the conveyor may descend), so that their weight is practically removed from the suspension members or shackles 8 and the body X of the fowl is supported by the trough and will be able to tumble about and turn in all directions while passing along through the trough, when struck by the beaters or picking fingers 15 and baffles 16 carried by the belts 14 and 13.

It is preferable that the fowls be suspended by adjacent one foot only from the shackle as shown best in FIG. 3 and that the shackle suspension have one or more swivel joints as at 9 and include a length of swivel or link chain 10 so that the suspended fowl can swing, tumble, and turn about in most every direction while in the picking trough and will not kink up the chain. It is also desirable that the relation or elevation of the picking machine be high enough to give support to the fowl yet preferably keep the shackles substantially clear of the rapidly moving feather removing beaters and tumbling baffles within the machine, and therefore the shackles should suspend the fowl at the lowermost end of the shackle.

It has been found that even if the fowls are suspended by both feet from a shackle, they still will be completely picked and between the legs if the legs are spread sufficiently as shown in FIG. 4 and the shackles are swivelly suspended as explained for FIG. 3. Also to be noted that if desired the fowl may be suspended from the head only, as by the single shackle of FIG. 3 though a few feathers covered by the shackle clamp and on or close to the head will be missed, but this is not important in some cases.

Generally but one trough-type tumble picker 3 of about a dozen feet long will handle all the fowl on a regular "picking line" as chickens are usually sufficiently spaced apart so as not to interfere, and pass along at a speed to keep them in the machine long enough for complete picking, but for some types of fowls and/or when using so-called "mild-scald" hot water, the machine may be longer, or two in line may be used, or with the conveyor running back and forth over suitable return guides or sprockets as indicated in FIG. 1 at 11 and 12, another tumble picker may be positioned as shown at 5. Also, while passing around these curves, the fowls may additionally be picked up by a circular trough tumble picker as indicated at 4 in FIG. 1 and detailed in FIGS. 6 and 7.

In either the straight or circular type of tumble picker the cross section of the trough may be the same as shown in FIG. 5 wherein two substantially confronting walls 13 and 14 are mounted so as to form a trough adapted to receive and support a fowl for tumbling about between them, and the walls also be relatively movable lengthwise or circumferentially (as the case may be), at least one, at high speed. The walls are respectively provided on their confronting sides with spaced conventional flexible frictional rubber fowl picking fingers or beaters 15 or their equivalent, and hold-back or spaced turning-over flexible frictional baffles 16.

For the straight trough machines the walls 13 and 14 are preferably both endless belts tilted to form a V-shaped trough between them, and each supported outwardly against smooth rigid walls 17, 18, each belt passing over pulleys 19, 20, at the ends of the trough, and each preferably driven by a separate variable speed motor indicated at 20' all as completely shown and described in the undersigned's Patent No. 2,846,719 referred to.

The circular type of tumble picker if used at the end turns of the conveyor or otherwise as at 4 in FIG. 1 may be as shown in FIG. 6 wherein the inner and outer circular walls 21 and 22 are both rotatable and in opposite directions at any desired relative speeds as by independent variable speed electric motors 23, 24. The outer circular wall 22 may be rotatably supported on trunnion rollers 25 on a circular track 26 and carries a circular gear ring 27 meshed by pinion 28 of motor 23. The inner wall 21 is that of a drum 29 revolvably supported on a vertical fixed shaft or column 30 and carrying a gear 31 meshing pinion 32 of motor 24.

In this machine the inner wall 21 is shown vertical and the outer wall 22 slanted to urge the tumbling fowls into the rapidly moving beaters or picking fingers, but they could both be slanted as shown in FIG. 5.

If the circular tumble picker just partially described were to be used under an overhead traveling conveyor for suspended fowl and making a turn as in position 4 of FIG. 1, the upper section 30' of the vertical fixed shaft 30 would be taken off from the parting line 33 together with its coupling 34 and the apparatus shown carried by it, so as to remove these obstructions to the free circular passage of the suspended fowls on their suspension shackles and chains, and of course the circular channel should substantially match the curve of the conveyor or sprocket around which it may be supported, as indicated at 4 in FIG. 1.

The entry and exit of the fowls into the circular picking channel would be made on a guiding apron as at 7 in FIG. 2 leading free over the upper edge of the outer wall 22 and similar guiding means also guiding the suspension chains at the exit as will easily be understood.

However, this circular machine can be provided with fowl suspension means of its own to handle fowl whether or not scalded while suspended on a conventional conveyor, or for the smaller user, or for other reasons, and in which case the upper part of the fixed shaft 30 is left intact as shown in FIG. 6 and if the machine were, say 5 feet in diameter and to be used for chickens, it could have about 6 or 8 equally spaced radially extending arms 35 pivoted at their inner ends at 36 to a freely revolvable head 27 supported on a ball collar 38 in turn supported on a rim cam 39 formed on the fixed coupling 34. Each arm is preferably slightly over counterbalanced as by a spring 40 to hold it up to the elevated position only when no fowl is on it. Swivelly suspended from adjacent the outer end of each arm is a fowl shackle 8 as described, preferably the single foot one of FIG. 3 just about centrally disposed over the circular picking channel, and as a fowl is attached to a shackle it will pull the arm 35 down until the channel takes the weight of the fowl, but the arm will be stopped to prevent the shackle going down into the beating zone by a roller 41 carried by the inner end of the arm coming into contact with the fixed cam 39 carried by the fixed shaft 30. The cam is circular except at one point 39' where it extends outwardly to raise the arm and lift the fowl out of the defeathering zone for manual replacing with another. The divided shaft and its coupling 34 provide for adjusting the height relation between the channel and the shackles without hooking up or letting down of the chain links.

In operation the fowls will be carried around the circular channel by the frictional striking force of the picking fingers or beaters at a speed determined by the counter motion of the outer ring of spaced hold back baffles, and each suspended fowl will be tumbled about and completely picked in one revolution, then its arm will be automatically lifted by the cam so that the fowl can be quickly removed and another one put on. The quickest way to do this manually is to simply lift the shackle off the upper swivel arm hook 42—at the end of the arm and hook on another shackle with a fowl already attached, though there are automatically releasing shackles which can be used. Also to be noted is that each arm 35 is preferably extended beyond the shackle so that its outer end may be used as a handle 35' to lift out any particular fowl if desired, as they travel but slowly around the machine.

A further feature is that the bottom of the troughed picking runway may have a crack 43 for the feathers and water to wash out, though in the belt design this may be crossed at intervals by structural bracing 45.

A further feature is the provision of a perforated hot water or exhaust steam pipe 44 along the upper edge of the runway and which may be stationarily supported by any suitable means on the circular machine, or from the hollow fixed shaft 30 through which the water or steam may be supplied as indicated.

Attention is called to the novelty and importance of the counter drive in the two picking belts 13 and 14 and similarly in the two circular machine circular picking elements 21 and 22 in the adjustability of their actual speeds and relative speeds, for in the first place there is an optimum picking speed which varies for very young tender pullets, another one for old hens, and another for big turkeys, for chickens it will range from about 3000 to 4000 feet per minute of the picking elements striking and passing the fowls—too high a passing speed will injure the fowl, and too low will not pick sufficiently.

However, if the hold-back elements were stopped and the picking elements were running at the optimum passing speed, any motion given to the hold-back elements (in either direction) would change the passing speed, and if going in the opposite direction at the same speed as the picking elements would (theoretically) double the passing speed, so they would both have to be slowed down to effect the optimum speed.

But most important is the effect on bodily travel of the fowl along the picking trough or channel, for with the hold-back baffle elements not moving the fowl will travel in direction of the motion of the picking elements and this reduces the passing speed and would be much faster than the overhead conveyor and keep the shackle suspension angularly pulling at the fowl to hold them back while preventing their free tumbling about and cause them to rise up bodily in the picking channel, and under these same conditions in the complete circular machine of FIG. 6 the fowl would go completely around the machine in so short a time they could not become picked in one revolution, for in the machine the adjustment of inner and outer speeds should be made to hold each fowl in the picking channel about 10 to 20 seconds for one revolution (depending on the type of fowl, its scalding treatment, and also the wear condition of the picking elements).

In the straight trough machine, or the circular machine, when used under an overhead carrier or conveyor on suspended fowls, the relative speeds of the opposite belts should be adjusted to yield a bodily motion of the fowl along the trough as close to the travel speed of the overhead conveyor as possible, to secure the best results, but also while maintaining the optimum passing speed of the picking elements which can only be done by relatively adjusting the speed of both opposed moving elements, for at many different relative speeds the bodily movement of the fowl may be in either direction, or stopped entirely, yet they will continue to tumble about. From the above it will be evident that in the straight run arrangement the fowl's bodily movement along the machine may be utilized to carry them along on their carrier track suspension as explained for the circular form of the machine, without the conveyor or carrier itself being power driven.

This is thought an entirely new mechanical process step in the art of the automatic mechanical picking of fowl, and is also claimed herein.

While the description has been principally directed to the picking of fowl, it should be clearly noted that prescalding or passing the blood-drained fowl through agitated hot water, is an important step of the process immediately before the actual defeathering step, and I have found that by the process described the fowl may be simultaneously both scalded and picked in the same machine if wet or exhaust steam be directed at the fowl as they are tumbled about in the trough by the picking and hold-back elements, for the reason that whereas with the old method of agitating a tank of hot water through which the fowl were passed on their conveyor suspension, the water did not readily reach the quill sockets of the feathers especially under the wings and between the legs, as those parts are not freely exposed and as the feathers themselves are waxy and ordinarily repel water, it requires a comparatively long soaking and violent agitation of the water in long tanks totalling some 45 feet (if the fowls are traveling with the conveyor at about one foot a second) but with the present suspended tumbling process the yielding striking and rubbing action of the defeathering fingers or beaters actually force the hot condensed steam or water directly into the bases of the feathers in a few moments, and they are liberated by the same succeeding action as the fowls travel along.

However, the picking while preferably always aided by a spray of hot water or steam (the latter condensing so rapidly when meeting the fowl as to avoid cooking the flesh of the fowl, if not excessively applied) still one or more trough type pickers may precede the first picker 3 of FIG. 1 as designated at 2, and while this scalder may be fitted inside precisely as described for machines 3 or 4 still, it may run much slower, and the picking elements may be smooth to reduce friction so as to limit them substantially to the pounding or forcing of the hot water or condensed steam into the feathers and skin of the fowl to loosen the feathers before the fowl enter the first actual picker (machine #3) and thus get the skin softened and water worked well into the sockets before actually pulling the feathers out.

Thus the same machines used under this new technique, completely changes the old method of traveling conveyor suspended fowls presented to various treatment in the defeathering process and effects a better picking job with but a fraction of the equipment heretofore required.

Also to be noted that the hot water or wet steam may be applied to the fowl in one or more of the regular picking machines in sufficient quantity to simultaneously care for the scalding and picking requirements.

Having thus described my improvement in the art of automatic mechanical picking of suspended fowl and the special means for carrying out the improvements, what I claim is:

1. The method of treating fowls for defeathering which comprises flexibly suspending the fowls each from an extremity of the fowl for moving along in a row above a supporting path below the fowl arranged to take most of their weight to substantially relieve their suspended weight, to thereby maintain the bodies of the fowl free for tumbling about substantially in all directions on said supporting path as they travel along under partial suspension, while mechanically subjecting the fowls to yielding engagement of rapidly moving flexible frictional feather engaging finger means applied in a manner to so tumble the fowls bodily about on said supporting path to expose all feathered parts to the action of the rapidly moving finger means while moving the fowls along on said path.

2. The method as set out in claim 1 wherein the treatment is carried out in the presence of hot water.

3. The method as set out in claim 1 wherein the treatment is carried out in the presence of steam.

4. The method of treating fowls for defeathering as set out in claim 1 wherein said supporting path is a channel in which the fowls are guided, and the rapidly moving finger means is positioned within the channel and moving lengthwise thereof.

5. The method as set out in claim 1 wherein the fowls are each swivelly suspended from one foot only.

6. The method as set out in claim 1 wherein the fowls are each swivelly suspended from two feet spaced apart.

7. The method as set out in claim 1 wherein the fowls are each swivelly suspended from the head only.

8. The method of treating fowls for defeathering as set out in claim 4 wherein said channel is circular in plan and at least partially around which the fowls travel and are supported as set out for freely tumbling about on their partial suspension, and the rapidly moving flexible feather engaging finger means extends around within said channel.

9. The method of treating fowls for defeathering as set out in claim 8 wherein the circular channel has spaced inner and outer walls mounted for rotation in opposite directions, and flexible feather engaging means is carried on both walls, the walls being rotated in opposite directions at relative speeds to control the desired progress of the fowl along the channel.

10. The method of treating fowls for defeathering as set out in claim 8 wherein the tumbling fowls are carried around in the circular channel by the rapidly moving feather engaging finger means together with their suspension, and automatically lifted out of the channel at a predetermined point in their passage about the channel.

11. Apparatus for the mechanical defeathering of fowl comprising the combination of traveling carrier means, provided with means flexibly suspending a row of fowls below it, each from an extremity of the fowl, means forming a fowl supporting path extending along below the row of suspended fowls substantially in line therewith arranged to support most of the weight of the fowls to substantially relieve their weight from their carrier suspension and maintain their bodies free for tumbling about as they travel along, said supporting path including an assemblage of fast moving flexible frictional feather engaging finger means movable along said path arranged to engage and tumble the so suspended and supported fowls bodily about in a manner to expose all feathered parts of the fowl to the action of said finger means, including under and over the wings and between the legs, as the fowls move along on said path under their partial carrier suspension, and power means for rapidly moving said finger means.

12. In a structure as set out in claim 11, said supporting path comprising a channel of a size to freely receive the fowls and permit free tumbling about therein of the bodies of the partially suspended fowls supported thereby, and the assemblage of moving feather engaging finger means is positioned within said channel and moving along the channel.

13. In a structure as set out in claim 11, said supporting path comprising a channel of a size to freely receive the fowls and permit free tumbling about therein of the bodies of the partially suspended fowls supported thereby, and said channel has spaced walls, at least one of which comprises a longitudinally movable belt, and the feather engaging finger means is carried on said belt, and power means is provided for rapidly moving said belt.

14. In a structure as set out in claim 13, and fowl retarding means is provided on the other wall to retard free bodily movement of the fowls in direction along the channel.

15. In a structure as set out in claim 12, and said channel comprises inner walls formed of longitudinally movable belts and the feather engaging finger means is carried on one of the belts, and frictional hold-back means is carried on the other belt to retard free bodily movement of the fowls in direction along the channel, and power means is provided for moving the belts relatively to control the bodily movement of the fowl along the channel and to substantially the same speed of travel of the carrier when the carrier is driven.

16. The combination structure set out in claim 11 wherein the means suspending the fowls from the carrier means comprises a series of suspension members, one for each fowl engaging the fowl by one foot only.

17. The combination structure set out in claim 11 wherein the means suspending the fowls from the carrier means comprises a series of suspension members, one for each fowl engaging the fowl by two feet spaced apart.

18. The combination structure set out in claim 11 wherein the means suspending the fowls from the carrier means comprises a series of suspension members, one for each fowl engaging the fowl by the head only.

19. The structure as set out in claim 12, said channel is circular and at least partially around which the partially suspended fowl travel and are supported below as set out, and the circular channel is formed of inner and outer separately rotatable walls and the feather engaging means is carried on at least one of said walls, and power means is provided for rotating the walls relatively.

20. In the structure as set out in claim 19 wherein the fowls are each suspended from a shackle member, and means is provided for automatically raising each shackle, when no fowl is on it.

21. In the structure as set out in claim 19 wherein the fowls are each suspended from a shackle member, and means is provided for automatically raising each shackle, together with its fowl from the channel at one point in the revolution of the fowl therein.

22. The structure as set out in claim 19 wherein means is provided for adjusting the distance from the fowl suspension and said channel.

23. In the combination as set out in claim 19, a column positioned centrally of the circular channel provided with a series of spaced arms radiating from and pivotally supported at their inner ends by said column, and with their outer ends projecting over the circular channel, a flexible fowl suspending member depending from each arm for so partially suspending a fowl in the channel, means counterbalancing each of said arms to lift them when no fowl is carried, and cam means at the column arranged to positively lift each arm, together with its fowl out of the channel, at a predetermined position about the circular channel.

24. The method of treating fowls for defeathering as set out in claim 1 wherein said supporting path is circular in plan and at least partially around which the fowl travel as set out.

25. The method of treating fowls for defeathering as set out in claim 1 wherein said supporting path is circular in plan and at least partially around which the fowl travel as set out and are at least partially supported by the flexible frictional finger means.

References Cited in the file of this patent

UNITED STATES PATENTS

| | | |
|---|---|---|
| 2,389,404 | Barker | Nov. 20, 1945 |
| 2,469,953 | Davis | May 10, 1949 |
| 2,603,831 | Sharp | July 22, 1952 |
| 2,753,477 | Barker et al. | May 1, 1956 |
| 2,777,158 | Pitts et al. | Jan. 15, 1957 |
| 2,777,159 | Pitts et al. | Jan. 15, 1957 |
| 2,782,457 | Lentz et al. | Feb. 26, 1957 |
| 2,855,625 | Corey et al. | Oct. 14, 1958 |